United States Patent [19]
Ito et al.

[11] Patent Number: 5,081,858
[45] Date of Patent: Jan. 21, 1992

[54] METHOD FOR FORMING A LUBRICANT COAT ON THE SURFACE OF A MATERIAL TO BE FORGED AND A FORGING DEVICE PROVIDED WITH A LUBRICANT COAT FORMING MEMBER

[75] Inventors: Yukio Ito, Yokkaichi; Tadashi Akazawa, Shijonawate; Takao Noguchi, Osaka, all of Japan

[73] Assignees: Daido Tokushuko Kabushiki Kaisha; Daido Machinery Ltd., Japan

[21] Appl. No.: 717,028

[22] Filed: Jun. 18, 1991

[30] Foreign Application Priority Data

Jun. 26, 1990 [JP] Japan .................. 2-167497

[51] Int. Cl.$^5$ ............................. B21B 45/02
[52] U.S. Cl. .......................... 72/43; 427/13
[58] Field of Search ............ 72/43, 42, 41, 46, 47; 427/13; 184/6.21

[56] References Cited

U.S. PATENT DOCUMENTS

| | | | |
|---|---|---|---|
| 3,802,238 | 4/1974 | Grant | 72/43 |
| 4,631,945 | 12/1986 | Hulings et al. | 72/43 |

FOREIGN PATENT DOCUMENTS

| | | | |
|---|---|---|---|
| 0122606 | 9/1980 | Japan | 72/43 |
| 0030023 | 3/1981 | Japan | 72/43 |
| 0237028 | 9/1989 | Japan | 72/43 |
| 1103919 | 7/1984 | U.S.S.R. | 72/43 |

Primary Examiner—Lowell A. Larson
Assistant Examiner—Michael J. McKeon
Attorney, Agent, or Firm—Davis, Bujold & Streck

[57] ABSTRACT

A method for forming a lubricant coat on a surface of steel slug to be forged and a forging device provided with a lubricant coat forming system. The method makes possible the forging of hard to work material, such as stainless steel. Highly durable parts can be manufactured easily. The durability of the metal molds of the forging device is increased, thereby decreasing the cost for the manufacture of the parts. In the method, the uniformly thick lubricant coat can be formed easily even on the transformed end surfaces of the material being worked, providing effective lubrication. The lubricant coat forming member can replace the oil lubrication of the related-art forging device of the inline type, in which the cut end surfaces of the material are not lubricated, without modifying the structure of the related-art forging device especially. The forging device of this invention continuously forges the material, lengthening the interval for replacing metal molds and decreasing the cost for the manufacture of the parts.

11 Claims, 4 Drawing Sheets

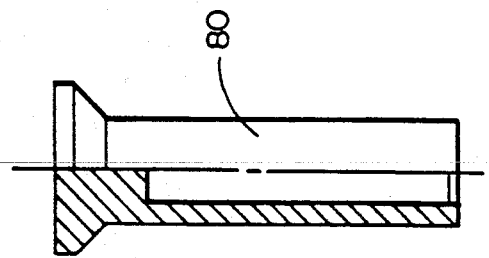
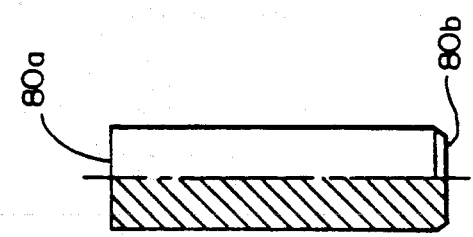
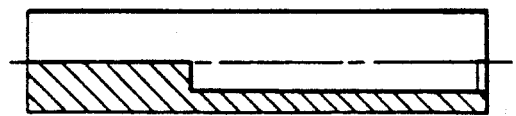
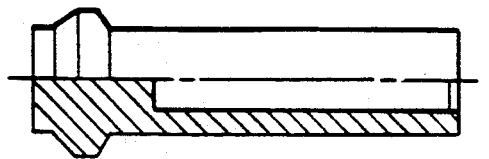
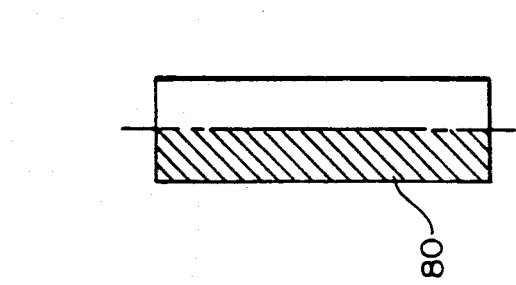
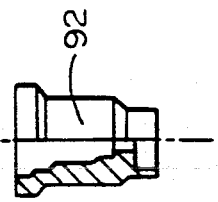
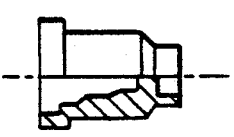
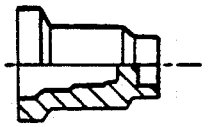
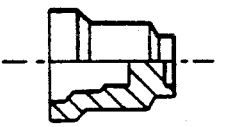
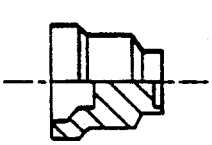
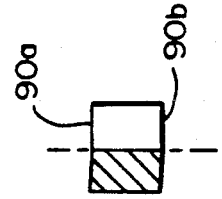
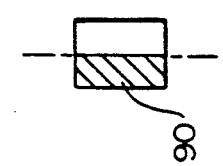

METHOD FOR FORMING A LUBRICANT COAT ON THE SURFACE OF A MATERIAL TO BE FORGED AND A FORGING DEVICE PROVIDED WITH A LUBRICANT COAT FORMING MEMBER

BACKGROUND OF THE INVENTION

This invention relates to a method for forming a lubricant coat on the surface of a steel material to be forged and a forging device provided with a member for forming such as a lubricant coat.

Recently, automobile, electronic, electric, architectural and other industrial fields increasingly require the reduction in the manufacturing cost of various parts. Consequently, the development of cold forging and warm or hot forging operations are increasingly demanded. Most parts ar made of carbon steel and low alloy steel through cold forging. For the cold forging, a horizontal parts former, a vertical parts former, a vertical press and other devices are available. The vertical press incorporates structure for dropping mineral oil or emulsive lubricant onto the surface of a starting material. The starting material is thus prevented from being burnt in a metal mold during forging.

Stainless steel, bearing steel, heat resisting steel and other materials which are hard to work are easily burnt in a metal mold and have other problems with present methods and devices for forging. Cold and warm forging are only partly used in the manufacture of the parts from such materials, because the dropping of lubricant onto the surface of the material provides insufficient lubricating performance. On the other hand, since such materials have high strength and corrosion-resistance, mass production of the parts from them is highly demanded. An effective lubricant is being developed. This lubricant, however, has problems in practical use. The lubricant needs to be formed into an effective lubricant coat having a constant and optimum thickness on the surface of the material to be useful. An irregularly thick lubricant coat would have variances in its lubricating performance, and would cause problems in the manufacture of the parts having strength and a complicated configuration. In an inline type forging device, a wire rod is cut, conveyed through and forged in multiple metal molds. The inline type forging device requires the development of means for applying lubricant onto the cut end surfaces of the cut pieces of the wire rod.

Consequently, this invention has been developed to enable the cold and warm forging of stainless steel and other materials which are hard to work, to lengthen the durability of the metal molds used for forging, and to forge products with a reduced cost.

SUMMARY OF THE INVENTION

Wherefore, an object of this invention is to provide a method for forming a lubricant coat having an optimum thickness uniformly on the surface of a material to be forged and to provide a forging device with a means for realizing that method.

According to the invention there is provided a forging apparatus having means for forming a substantial uniform lubricant coat on a surface of a electrically conductive slug to be forged and means for forging the lubricant coated slug into a desired shape wherein the means for forming a lubricant coat comprises means for electrostatically charging a particulate lubricant, a lubricant applicator comprising an electrically insulated closable space adapted to receive the slug therein with at least the surface to be coated exposed within the space, means for electrically grounding the slug when so disposed in the space, an inlet facilitating introduction of charged lubricant particles into the space with the surface to be coated exposed thereto, the charged lubricant particles being attracted to the electrically grounded slug thereby to form said uniform coat lubricant on said surface.

According to the invention there is also provided a method of forming a uniformed lubricant coat on a surface of an electrically conductive slug to be forged comprising the steps of exposing said surface in an electrically insulated closed space, electrically grounding the slug while in said space, electrostatically charging a particulate lubricant, introducing the electrically charged particulate lubricant into the closed space so that said surface is exposed thereto, and allowing the electrostatically charged particulate lubricant attracted to said surface to form said uniformed coat thereon. The particulate lubricant includes lubricant powder and sprayed suspension lubricant.

In this invention, the particular lubricant charged with high voltage sticks to the surface of the steel material exposed into the specified space. Since coulomb force acts between the particular lubricant and the steel material, the particular lubricant is attracted, thereby sticking to the surface of the steel material. By grounding the steel material, the surface of the steel material is made equipotential, and a lubricant coat is formed uniformly on the surface of the steel material. The thickness of the lubricant coat is regulated according to the supply amount of the particular lubricant, the time period for treating the surface of the steel material, the volume of the specified space incompletely closed, and other conditions. The effective lubrication is assured during the forging of the steel material. Even the material hard to work can be forged easily. The lubricant coat is formed so uniformly that the lubricating effect is prevented from being impaired irregularly. The lubricant coat is appropriate for the forging and other intense work of the material having a complicated configuration.

The lubricant coat forming member has the structure of a subassembly having a space therein by closing both ends of its cylindrical body. The lubricant coat forming member can be assembled onto and disassembled from any portion of the forging device. Since the lubricant coat forming member is detachably attached to the portion before the intense work member requiring the formed lubricant coat, the forging device requires no special structural modification thereon.

When the forging follows the swaging, the uniformly thick lubricant coat can be formed, using the coulomb force, even on the surface of the material made irregular through the swaging. Consequently, the material can be worked intensely without any irregularity in lubrication.

The subassembly of the lubricant coat forming member can be provided before any of multiple intense work members, such that the steel material having the lubricant coat formed thereon can be fed into the intense work member. The subassembly of the lubricant coat forming member can be provided before the punch or other light work members.

BRIEF DESCRIPTION OF THE DRAWINGS

FIGS. 5A through 5F are explanatory views showing the configuration at each forging step of a SUS430 steel part.

FIGS. 6A through 6G are explanatory views showing the configuration at each forging step of a SUS410 steel part.

DETAILED DESCRIPTION OF THE PREFERRED EMBODIMENT

Figure 1:
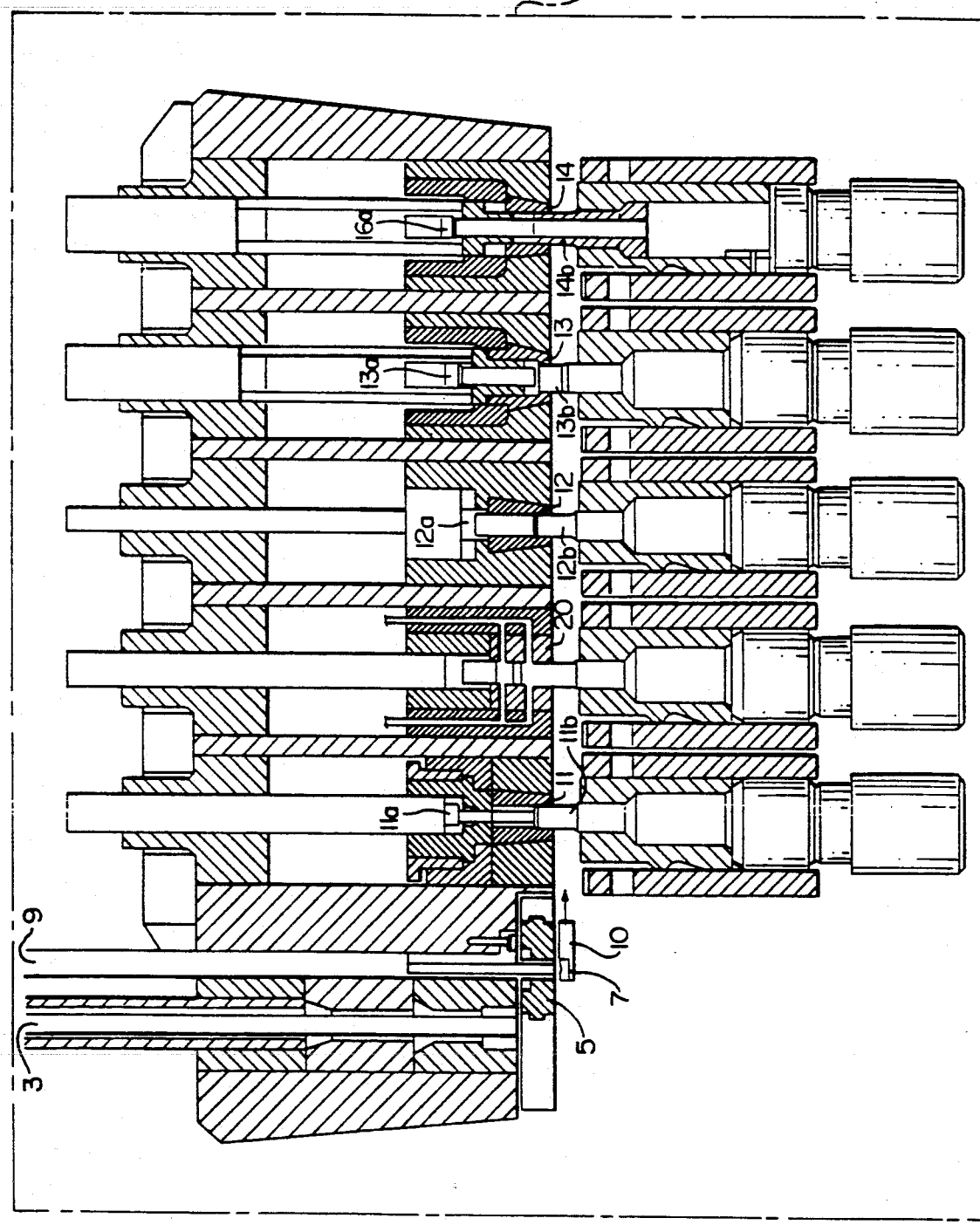
FIG. 1 is a cross-sectional view of a forging device embodying the invention.
Figure 2:
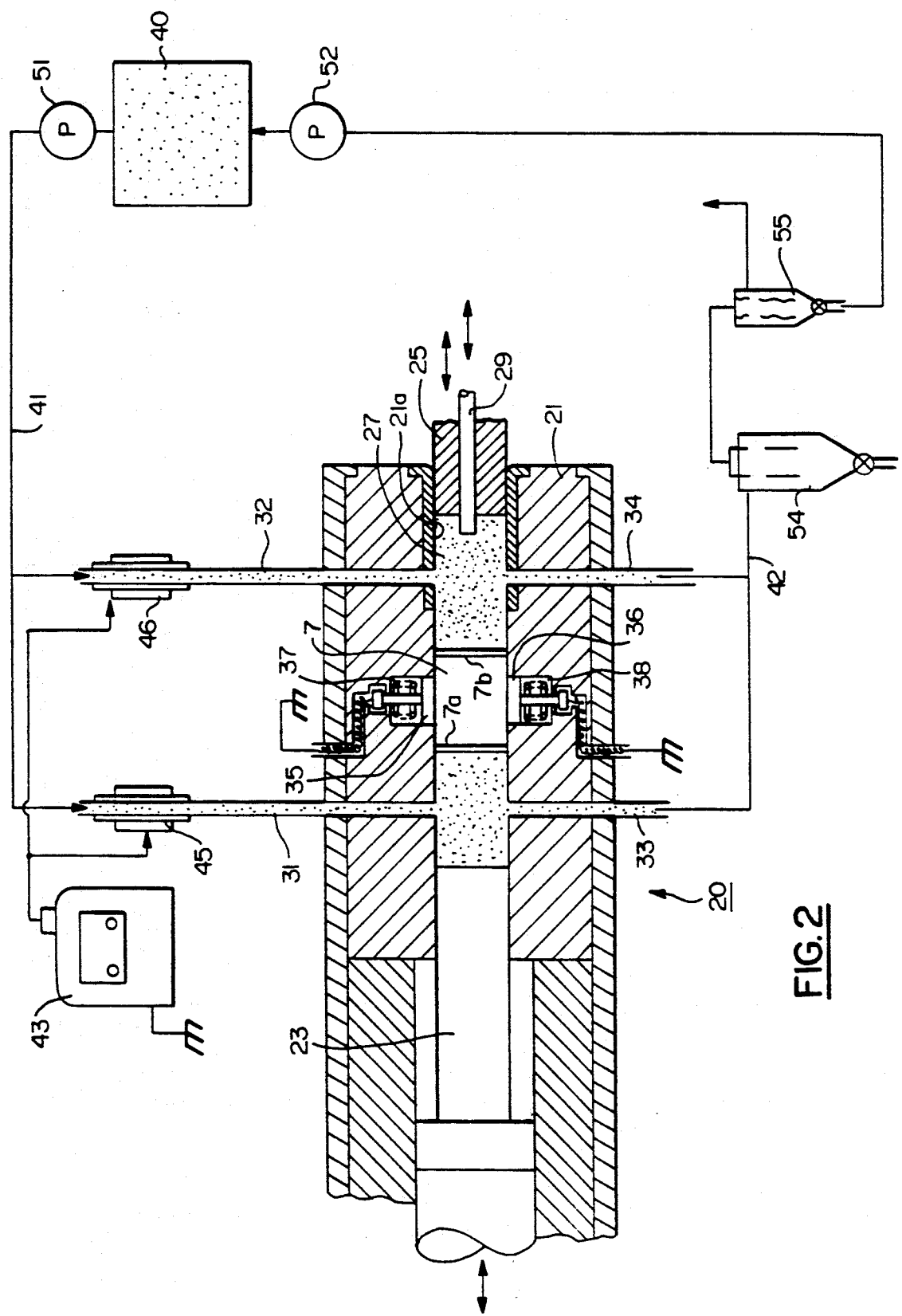
FIG. 2 is a cross-sectional view of a lubricant coat forming member in the forging device.
Figure 3F:
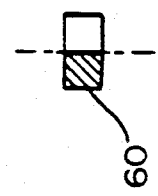
FIGS. 3A through 3F are explanatory views showing the configuration at each forging step of a SUJ2 steel part.
Figure 3E:
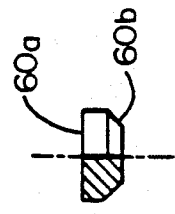
Figure 3D:
Figure 3C:
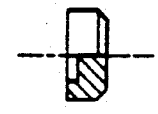
Figure 3B:
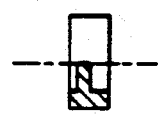
Figure 3A:
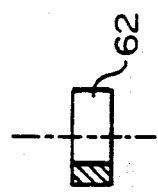
Figure 4F:
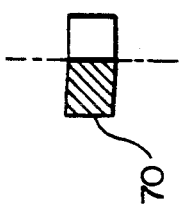
FIGS. 4A through 4F are explanatory views showing the configuration at each forging step of a SUS304 steel part.
Figure 4E:
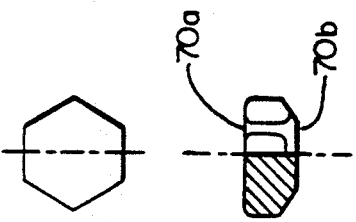
Figure 4D:
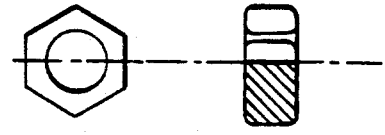
Figure 4C:
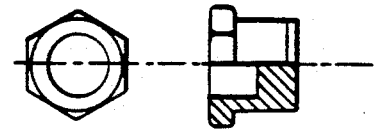
Figure 4B:
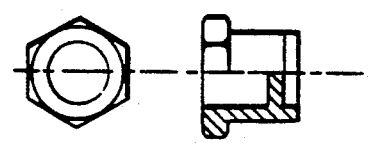
Figure 4A:
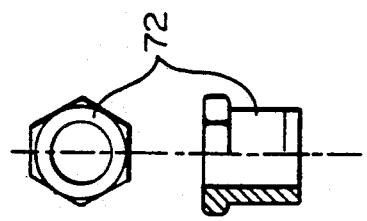

In this embodiment, various materials which are hard to work are forged into bearing parts and other parts using the forging device shown in FIGS. 1 and 2 by means of the steps shown in FIGS. 3A through 6F.

As shown in FIG. 1, a forging device 1 is an inline type device for cutting a steel material before forging. A starting material 3 in the form of a coil is straightened by a pinch roller (not shown), preheated by a heating device (not shown), and guided into a body 1a. The starting material 3, in turn, is cut into slugs 7, having predetermined dimensions, by a cutter 5 movable in the body 1a. Each of the slugs 7 is pushed out of the cutter 5 by a pusher 9 and caught by a transfer device 10. The slugs 7 held by the transfer device 10 are fed through a first metal mold 11, a second metal mold 12, a third metal mold 13, a fourth metal mold 14 and other successive metal molds (not shown) for forging. In the forging device 1 an electrostatic lubricant applicator 20 is interposed between the first metal mold 11 and the second metal mold 12 to form, as shown in FIG. 2, a lubricant coat on both cut end surfaces 7a and 7b of each slug 7.

The applicator 20 is detachably assembled into the forging device 1 in the same way as the first through fourth metal molds 11, 12, 13 and 14. As shown in FIG. 2, the applicator 20 comprises a cylindrical body 21, which is composed of electrically insulating material and has a central bore 21a therein. One end of the central bore 21a is closed by a knockout pin 23. A punch 25 extends into the other end of the central bore 21a to close that other end. By closing the central bore 21a completely by means of the knockout pin 23 and the punch 25, a lubricant coat forming space 27 is formed in the central bore 21a. The knockout pin 23 is structurally and operationally the same as knockout pins 11a, 12a, 13a and 14a provided in the first, second, third and fourth metal molds 11, 12, 13 and 14, respectively. The punch 25 is structurally and operationally the same as forging punches 11b, 12b, 13b and 14b provided in the first, second, third and fourth metal molds 11, 12, 13 and 14, respectively, except that the punch 25 comprises a double casing and has a pin 29 therein. The pin 29 is driven separately from the punch 25, and is movable into and out of the lubricant coat forming space 27. The central bore 21a in the cylindrical body 21 has almost the same diameter as the outer diameter of the slug 7 forged in the first metal mold 11. The inlet end of the central bore 21a is strengthened by a bushing. Lubricant supply passages 31 and 32, and lubricant exit passages 33 and 34 are formed of an electrically insulating material in the central bore 21a. One end of the lubricant supply passages 31 and 32 open through the side wall of the cylindrical body 21 opposite one end of the lubricant exit passages 33 and 34 which open into the central bore 21a. The cylindrical body 21 of the applicator 20 also has slugs 35 and 36 composed of conductive material. The slugs 35 and 36 are placed diametrically opposite one another in the side walls of the bore 21a around the center thereof. The slugs 35 and 36 are urged into and out of the lubricant coat forming space 27 by coil springs 37 and 38 provided behind the slugs 35 and 36, respectively. Each of the slugs 35 and 36 is electrically grounded.

The lubricant supply passages 31 and 32 are branched from a supply passage 41. The supply passage 41 is composed of electrically insulating material and leads from a lubricant container 40 containing powdered lubricant. On the other hand, the lubricant exit passages 33 and 34 join to form a feed passage 42. The feed passage 41, the lubricant supply passages 31, 32, the lubricant exit passages 33, 34, and the feed passage 42 thus form a closed loop for supplying and collecting the powdered lubricant from and to the lubricant container 40. After the supply passage 41 has been branched, electrical charge elements (coils) 45 and 46 are provided on the lubricant supply passages 31 and 32, respectively. The elements 45 and 46 permit corona discharge from a high voltage power source 43 at direct current high voltage. The high voltage power source 43 supplies the voltage of 80 kV to the elements 45 and 46.

The procedure followed in the lubricant coat forming operation by the forging device 1 will now be explained. After completing the light forging of the slug 7 in the first metal mold 11, the slug 7 is moved by the transfer device 10 toward the inlet of the cylindrical body 21 of the applicator 20. Subsequently, the slug 7 is forced by the punch 25 into the inlet of the central bore 21a in the cylindrical body 21. At the same time, the punch 25 closes the inlet of the central bore 21a, thereby forming the lubricant coat forming space 27 completely closed. Subsequently, the pin 29 is driven to force the slug 7 further into the lubricant coat forming space 27. The slug 7 is then engaged by the slugs 35 and 36 and the pin 29 retreats into the punch 25. The slug 7 is electrically grounded by the slugs 35 and 36 and held in the completely closed lubricant coat forming space 27.

The powdered lubricant is pumped by a feed pump 51 from the lubricant container 40 to the elements 45 and 46, in which the powdered lubricant is charged with a high voltage. The powdered lubricant from the elements 45 and 46 is introduced via the lubricant supply passages 31 and 32 into the lubricant coat forming space 27. Subsequently, the powdered lubricant in the lubricant coat forming space 27 is electrostatically attracted onto the cut end surfaces 7a and 7b of the slug 7 using the coulomb force resulting from the potential difference between the powdered lubricant and the slug 7. Since the electric potential is uniformly zero over the cut end surfaces 7a and 7b of the slug 7, the lubricant coat is formed uniformly thick over the cut end surfaces 7a and 7b. The excess of the powdered lubricant is taken by a return pump 52 from the lubricant coat forming space 27 through the lubricant exit passages 33 and 34 back to the lubricant container 40. In the lubricant exit passages 33 and 34, a cyclone dust collector 54 removes coarse particles and an exhaust filter 55 removes fine particles. The slug 7 with the lubricant coat formed on the cut end surfaces 7a and 7b is pushed out of the cylindrical body 21 of the applicator 20 by the knockout pin 23 driven forward. Subsequently, the slug 7 is caught by the transfer device 10 and transferred to the second metal mold 12. The supply amount of the powdered lubricant and the time period for forming the lubricant coat are determined so that the lubricant coat has the target thickness of 50μ.

In the forging device 1 having the aforementioned structure, various materials which are hard to work were forged into bearings and other parts. According to the configuration of the parts and the number of work steps for forging the parts, the subassemblies of the metal molds 11, 12, 13 and 14 were assembled into or disassembled from the forging device 1. The materials of the forging punches 11b, 12b, 13b, and 14b of the metal molds 11, 12, 13 and 14 are shown in Table 1.

TABLE 1

| CONTENT | STEEL SINTERED STEEL CORRESPONDING TO SKH53 % BY WEIGHT |
|---|---|
| C | 1.3 |
| Cr | 4.0 |
| Mo | 5.0 |
| W | 6.5 |
| V | 3.0 |
| HARDNESS (HRC) | 65 |

As the powdered lubricant, oxide powder mainly composed of commercial phosphoric acid was used. As the material to forge, the coil materials of SUJ2, SUS304, SUS430, SUS410 steels were used. The content and hardness of the steels, and the conditions for forming the lubricant coat on the surface of the coil materials before cutting are shown in Table 2. The cut end surfaces of the coil materials were not lubricated at this stage.

As shown in FIGS. 3, 4, 5 and 6, steel materials A, B, C and D are shaped into different configurations, depending on the type of the steels. FIGS. 3, 4, 5, and 6 are front views of the steel materials A, B, C and D, respectively. As the figures are viewed, the left halves of the front views are shown in cross sections.

The steel material A was forged, while the lubricant coat was formed in the forging device 1 using the powdered lubricant. Specifically, the steel material A was preheated at 200° C. and 400° C. The steel material A was cut into slugs 60, which had cut end surfaces 60a and 60b and the lubricant coat was formed on the cut end surfaces 60a and 60b using the powdered lubricant in the forging device 1. As shown in FIGS. 3A through 3E, the slugs 60 were forged into bearing races 62 through five work steps. For comparison, when the steel material A was preheated, the cut end surfaces 60a and 60b were lubricated only with oil before forging.

The steel material B was preheated at 300° C. for the embodiment and comparison. The steel material B was cut into slugs 70 having cut end surfaces 70a and 70b, and, as shown in FIGS. 4A through 4E, the slugs 70 were forged into couplings 72 through five work steps.

For the embodiment, the steel materials C and D were preheated at 200° C. and 400° C. The steel material C was cut into slugs 80 having cut end surfaces 80a and 80b, and, as shown in FIGS. 5A through 5E, the slugs 80 were forged into anchor bolts 82 through five work steps. The steel material D was cut into slugs 90 having cut end surfaces 90a and 90b, and, as shown in FIGS. 6A through 6F, the slugs 90 were forged into the housings 92 for an electronically controlled fuel injection device. For comparison, the steel materials C and D were preheated at 200° C.

As an auxiliary lubricant in the embodiment and as a lubricating oil for comparison, for use was the lubricant having the tradename of "Neocool SPH-3B" and manufactured by Matsumura Sekiyu in Japan.

The results of the aforementioned forging are shown in Table 3.

TABLE 2

| | STEEL MATERIAL | | | |
|---|---|---|---|---|
| STEEL TYPE | A SUJ2 | B SUS304 | C SUS430 | D SUS410 |
| CONTENT | % BY WEIGHT | % BY WEIGHT | % BY WEIGHT | % BY WEIGHT |
| C | 1.00 | 0.05 | 0.02 | 0.14 |
| Si | 0.21 | 0.42 | 0.32 | 0.43 |
| Mn | 0.25 | 1.49 | 0.37 | 0.75 |
| P | 0.01 | 0.036 | 0.030 | 0.028 |
| S | 0.004 | 0.025 | 0.011 | 0.023 |
| Cu | 0.03 | 0.30 | 0.07 | 0.07 |
| Ni | 0.05 | 8.10 | 0.34 | 0.28 |
| Cr | 1.40 | 18.00 | 16.20 | 11.55 |
| Mo | 0.02 | 0.16 | 0.08 | 0.06 |
| MATERIAL HARDNESS (Hv) | 180 | 165 | 180 | 170 |
| LUBRICANT COAT ON THE SURFACE OF THE COIL MATERIAL | ZINC CALCIUM PHOSPHATE AND METALLIC SOAP | OXALATE COAT | OXALATE COAT | OXALATE COAT |

TABLE 3

| STEEL MATERIAL NO. | STEEL TYPE | TEST NO. | COIL HEATING TEMPERATURE (°C.) | END SURFACE LUBRICATION | THE NUMBER OF MANUFACTURE |
|---|---|---|---|---|---|
| A | SUJ2 | 1 | 200 | NO | 50,000 |
| | | 2 | 200 | YES | 150,000 |
| | | 3 | 400 | YES | 256,000 |

TABLE 3-continued

| STEEL MATERIAL NO. | STEEL TYPE | TEST NO. | COIL HEATING TEMPERATURE (°C.) | END SURFACE LUBRICATION | THE NUMBER OF MANUFACTURE |
|---|---|---|---|---|---|
| B | SUS304 | 4 | 300 | NO | 500 |
|  |  | 5 | 300 | YES | 14,800 |
| C | SUS430 | 6 | 200 | NO | 26,000 |
|  |  | 7 | 200 | YES | 95,000 |
|  |  | 8 | 400 | YES | 185,000 |
| D | SUS410 | 9 | 200 | NO | 9,500 |
|  |  | 10 | 200 | YES | 27,500 |
|  |  | 11 | 400 | YES | 98,000 |

The column of the number of manufacture in Table 3 indicates the number of the products which were manufactured by the forging device 1 without replacing any forging punch with a new one. As clearly shown in Table 3, the number of manufacture from the steel materials A, B, and D which had the lubricant coat formed of the powdered lubricant thereon is larger by one or two orders for the products than that from the steel materials A, B, and D which had no lubricant coat formed. Consequently, the lubricant coat on the cut end surfaces of the steel materials contributes to the increase in the number of the products. For the steel material C, as shown in Table 3, the number of manufacture at the test No. 7 in which the lubricant coat was formed is four times as large as the number of manufacture at the test No. 6 in which no lubricant coat was formed.

After the step for forming the lubricant coat, the slug 60 was taken out for check. As a result, it was confirmed that the lubricant coat on the cut end surfaces 60a and 60b had the uniform thickness of about 50μ.

As aforementioned, the uniformly thick lubricant coat can be formed on the cut end surfaces of the steel materials by the forging device using the method for forming the lubricant coat of this embodiment. The uniformly thick lubricant coat can effectively increase the number of manufacture through forging. The forging device and the method for forming the lubricant coat can realize the simple forging of the material hard to work, for example, SUS304. In the embodiment, the material hard to work can be easily forged into parts having a complicated configuration.

At the same time, in this embodiment, the applicator 20 has the structure of a subassembly. The subassembly comprises the cylindrical body 21 mainly. The applicator 20 and the metal molds can be replaced with each other in the forging device 1. Consequently, the forging device 1 can be assembled according to the configuration of forged products, such that the lubricant coat can be formed at any necessary work step.

This invention has been described above with reference to a preferred embodiment as shown in the drawings. Modifications and alterations may become apparent to one skilled in the art upon reading and understanding the specification. Despite the use of the embodiment for illustration purposes, however, it is intended to include all such modifications and alterations within the scope and spirit of the appended claims.

In this spirit, it should also be noted that in the embodiment as shown and described, the steel material is cut into slugs in the forging device 1 of the inline type. However, outside the forging device, the steel material could be cut into the slugs, and the cut end surfaces of the slugs could be lubricated by forming the uniformly thick lubricant on the cut end surfaces.

In the forging device 1 of the inline type or in the forging device of other type, the incompletely closed space existing between the body 1a and the first metal mold 11 could be used for forming the lubricant coat. By grounding the transfer device 10, the slug 7 could be grounded while the lubricant coat is formed on the cut end surfaces 7a and 7b of the slug 7.

When the couplings 72 are manufactured, the applicator 20 could be provided before the work steps shown in FIGS. 6C through 6E, respectively, thereby increasing the durability of the metal molds 11, 12, 13 and 14 in the forging device 1. When in the forging device 1 of the inline type the uniformly thick lubricant coat is thus formed on the cut end surfaces of the materials being forged into the products having a complicated configuration, the invention provides its further conspicuous effectiveness.

This invention could be applied to the cold forging. The type of the lubricant is not limited to the aforementioned. For example, suspension type lubricant could be sprayed and supplied. In the course of such supply, the elements 45 and 46 could charge the suspension type lubricant with high voltage. The sprayed and electrified suspension type lubricant could be used.

The lubricant coat could be formed on all the surfaces as well as the cut end surfaces of the materials.

In the embodiment, the direct current high voltage of 80 kV is supplied to the elements 45 and 46. Negative direct current high voltage, however, could be supplied.

Wherefore, having thus described the present invention, what is claimed is:

1. A forging apparatus having means for forming a substantial uniform lubricant coat on a surface of an electrically conductive slug to be forged and means for forging the lubricant coated slug into a desired shape wherein the means for forming a lubricant coat comprises:

means for electrostatically charging a particulate lubricant;

a lubricant applicator comprising an electrically insulated closable space adapted to receive the slug therein with at least the surface to be coated exposed within the space;

means for electrically grounding the slug when so disposed in the space;

an inlet facilitating introduction of charged lubricant particles into the space with the surface to be coated exposed thereto;

the charged lubricant particles being attracted to the electrically grounded slug thereby to form said uniform coat of said lubricant on said surface.

2. A forging device according to claim 1 including means for conveying the slug through the forging device, said means being located to convey the slug into and out of the closable space when open.

3. A forging device according to claim 2 in which the forging means comprising a plurality of forging stations for progressively shaping the slug into a desired shape wherein the means for forming a uniform lubricant coat on a surface of the slug is disposed between a first and a second of the forging stations.

4. A forging device according to claim 1 wherein the means for electrostatically charging the particulate lubricant is an element disposed about said inlet to the closable space, said element being connected to a source of high voltage direct current electricity.

5. A forging device according to claim 1 wherein the slug is located in the closable space during the coating operation by an opposed pair of spring biased plugs which are electrically conductively connected to ground.

6. A forging device according to claim 1 wherein said closable space has at least one outlet for receiving surplus particulate lubricant for recycling through cleaning devices for recharging and reintroduction into said inlet.

7. A forging device according to claim 1 wherein said closable space is defined, at least where occupied by the slug during coating, by an electrically insulating material and said inlet and said outlet are also defined by electrically insulating materials.

8. A forging device according to claim 1 wherein the means for forming a lubricant coat is an assembly detachable from the forging means.

9. A method of forming a uniformed lubricant coat on a surface of an electrically conductive slug to be forged comprising the steps of:
   exposing said surface in an electrically insulated closed space;
   electrically grounding the slug while in said space;
   electrostatically charging a particulate lubricant;
   introducing the electrically charged particulate lubricant into the closed space so that said surface is exposed thereto; and
   allowing the electrostatically charged particulate lubricant attracted to said surface to form said uniformed coat thereon.

10. A method according to claim 9 wherein said electrostatic charge is produced by a corona discharge produced by the application of a high voltage, direct current electrical supply to coils through which the particulate lubricant passes to the closed space.

11. A method according to claim 9 wherein said closed space is opened for the transfer of a slug into the space and the transfer of a lubricant coated slug out from the space by means of a transfer device used to transfer the slug through a forging device during forging.

* * * * *